United States Patent [19]
Justice

[11] B 3,916,092
[45] Oct. 28, 1975

[54] TRANSMISSION SYSTEM FOR AUDIO AND CODING SIGNALS IN EDUCATIONAL TV

[75] Inventor: James W. H. Justice, Murrysville, Pa.

[73] Assignee: Westinghouse Electric Corporation, Pittsburgh, Pa.

[22] Filed: May 25, 1973

[21] Appl. No.: 364,163

[44] Published under the Trial Voluntary Protest Program on January 28, 1975 as document no. B 364,163.

[52] U.S. Cl. ............ 178/5.6; 178/DIG. 23; 358/12
[51] Int. Cl.[2]... H04N 7/08; H04N 9/32; H04N 9/34
[58] Field of Search........... 178/DIG. 23, 5.6, 5.2 R, 178/5.8 R; 179/15 BM; 358/12

[56] References Cited

UNITED STATES PATENTS

| | | | |
|---|---|---|---|
| 2,268,001 | 12/1941 | Von Felgel-Farnholz | 178/5.6 |
| 3,256,386 | 6/1966 | Morchand | 178/DIG. 23 |

*Primary Examiner*—Richard Murray
*Assistant Examiner*—R. John Godfrey
*Attorney, Agent, or Firm*—M. P. Lynch

[57] ABSTRACT

An educational TV system features a transmitter receiver for a plurality of audio and coding signals along with multiple pictures. Bursts of audio signals are modulated in pairs onto 3.6 megahertz quadrature phase subcarriers in the same way as conventional I and Q video signals are modulated onto a subcarrier in conventional TV systems. Modulated onto each quadrature phase of the 3.6 megahertz subcarrier is an audio pulse signal. The resulting burst of phase and amplitude modulated subcarriers are produced during a blanked guard-band interval. This process is repeated with another pair of audio signals whereby two time divided bursts of modulated subcarriers are produced during the blanked guard-band interval which is located midway within the horizontal scan line time period used to transmit modulated video signals on a subcarrier. Coding signals are introduced onto the carrier signal during the time of the back porch of the video signal. In the receiver, after detecting and demodulating the bursts of audio signals, switching and logic circuitry perform both audio and picture switching operations to select an audio signal for driving a loud-speaker or headphone. The conventional audio FM channel associated with TV signal transmissions is also provided and operates in the conventional manner.

20 Claims, 8 Drawing Figures

Figure 4:
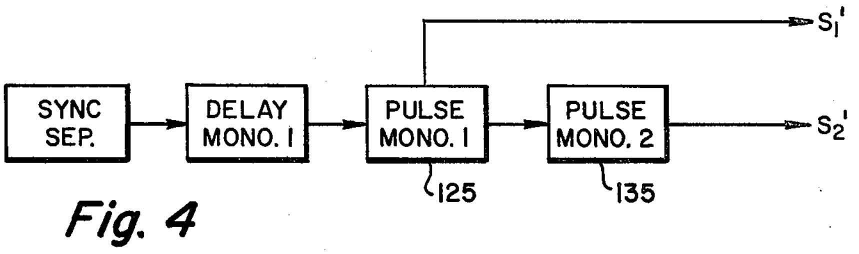

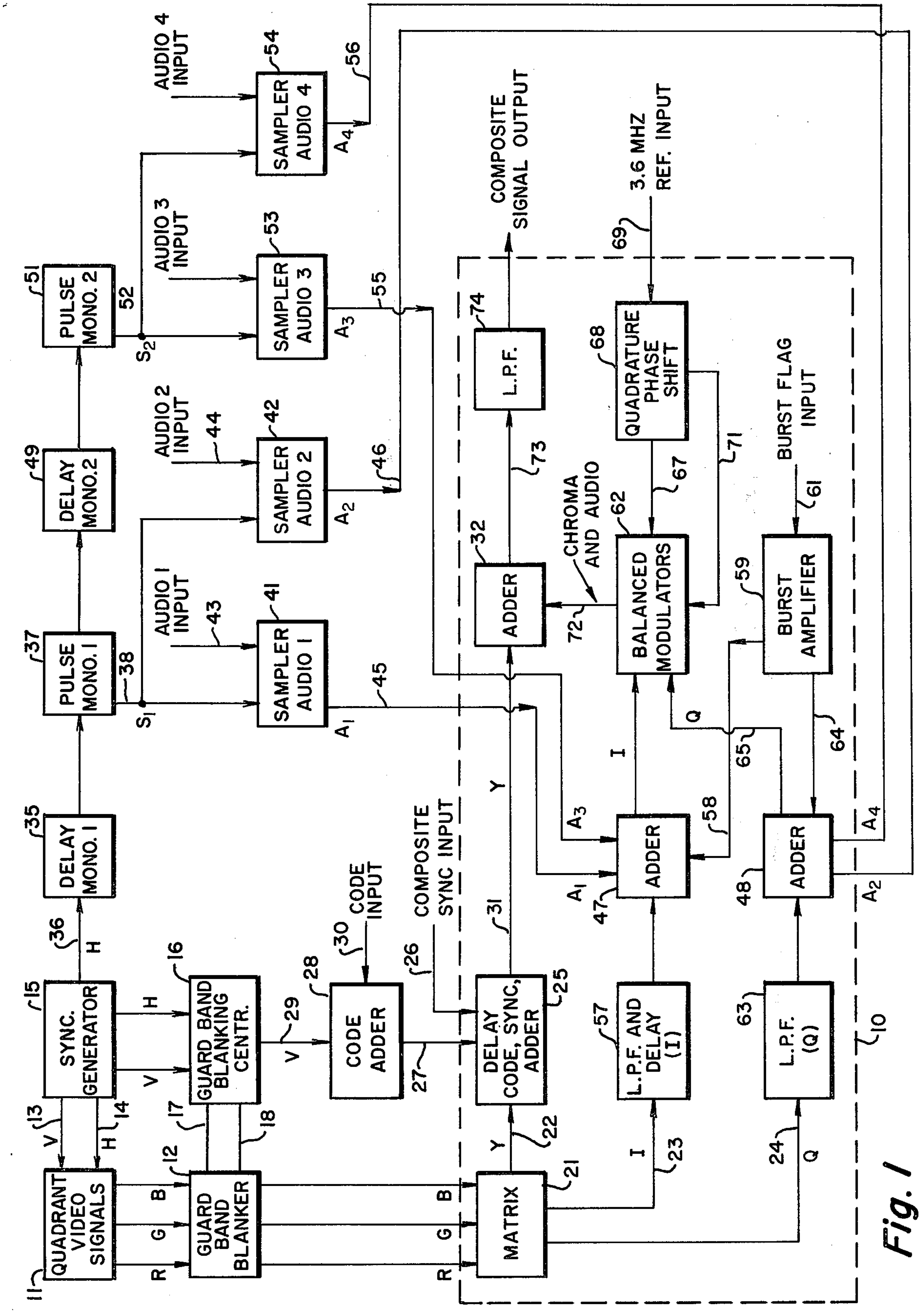
Fig. I

TRANSMISSION SYSTEM FOR AUDIO AND CODING SIGNALS IN EDUCATIONAL TV

BACKGROUND OF THE INVENTION

The present invention relates to a TV transmission system whereby audio and coding information can be transmitted and received by the use of a blanked guard-band interval defined within the video subcarrier signal. The system is particularly useful in the field of educational television.

Systems, such as those shown in Morchand U.S. Pat. Nos. 3,180,931 and 3,256,386 have been provided for the simultaneous transmitting over a single television channel carrier frequency a plurality of pictures or scenes which are normally displayed in the four quadrants of a television receiving tube. An arrangement of this sort is particularly adaptable for use in educational television systems. Thus, the instructor at the transmitting station may cause different scenes or written material to appear in the four quadrants of a remote receiving tube as viewed by the student. He could then pose a problem via the conventional FM audio channel of the television system and ask which one of the four quadrants contains the correct answer; i.e., a multiple choice question. By depressing one of four switches at the receiver, the student would then blank out all but one of the four quadrants which he feels contains the correct answer. These switches would control a programmed coding circuit which could be made responsive to coding signals, if transmitted to the receiver.

In systems of this sort, great advantages to learning processes can be made by providing, for example, four audio channels containing audio material correlated with the video information displayed in the four quadrants of the picture tube. The audio material may take the form of explanatory material, or instructions may be given to the student in regard to the video information displayed in each of the quadrants. Such audio information may also include a lecture or discussion concerning the material in each video quadrant. In order to effectively make use of such an educational television system, the audio information may be repeated a number of times in each of the four channels so that a student may proceed with the learning process at a given pace from the information displayed from one quadrant to the next quadrant while making use of the audio information. The foregoing discussions concerning the use of an educational television represent but a few of the many possibilities that are available when multiple audio channels may be coupled with multiple video displays on the receiving tube. The use of multiple audio channels may be used with great benefit where a single television picture occupies the entire frame of the receiving tube.

SUMMARY OF THE INVENTION

In accordance with the present invention a blanked vertical bar separates pictures into right and left hand pairs of quadrants of the receiving tube which is accomplished by providing a blanked guard-band interval in the luminance and chrominance video signals during which a plurality of audio signals are transmitted on subcarrier signals. Alternatively, the blanked guard-band interval may be located, if desired, immediately following the color reference burst in the horizontal scan line of TV systems where a single TV picture occupies the entire screen of the receiving tube. In this event, the blanked guard-band interval will appear as a vertical bar along the left hand side of the receiving tube.

More particularly, in accordance with the present invention, there is provided an educational television system including a transmitter comprising the combination of: gate sampler means for each of a plurality of audio signals, pulse control means rendering conductive the gate sampler means to provide separate pairs of the audio signals, blanker means for defining a blanked guard-band interval during each horizontal scan line, and means for modulating the pairs of audio signals onto a subcarrier signal in a phased displaced relation during the blanked guard-band interval. More specifically, the present invention provides that the pulse control means take the form of a plurality of monostable multivibrator means for providing time delayed control signals that render conductive the audio sampler gates.

The receiver, according to the present invention, includes the combination of: detector means for demodulating an R.F. carrier signal to recover subcarrier signals containing modulated video signals and bursts of modulated pairs of audio signals during a blanked guard-band interval in the video signals, means for demodulating the subcarrier signals, a plurality of gate means rendered conductive during the blanked guard-band interval to recover the separate audio signals for the signal burst of each pair thereof, and switching means receiving the audio signals for selective coupling to a speaker. In the preferred form, blanker means define a blanked guard-band period in the video signals after demodulation and decoding, during which recovery of the audio signals occurs. The preferred form further includes a code signal gate receiving a demodulated video signal and a blanking generator for rendering the code signal gate conductive during the vertical blanking period to recover code signals.

Figure 2:
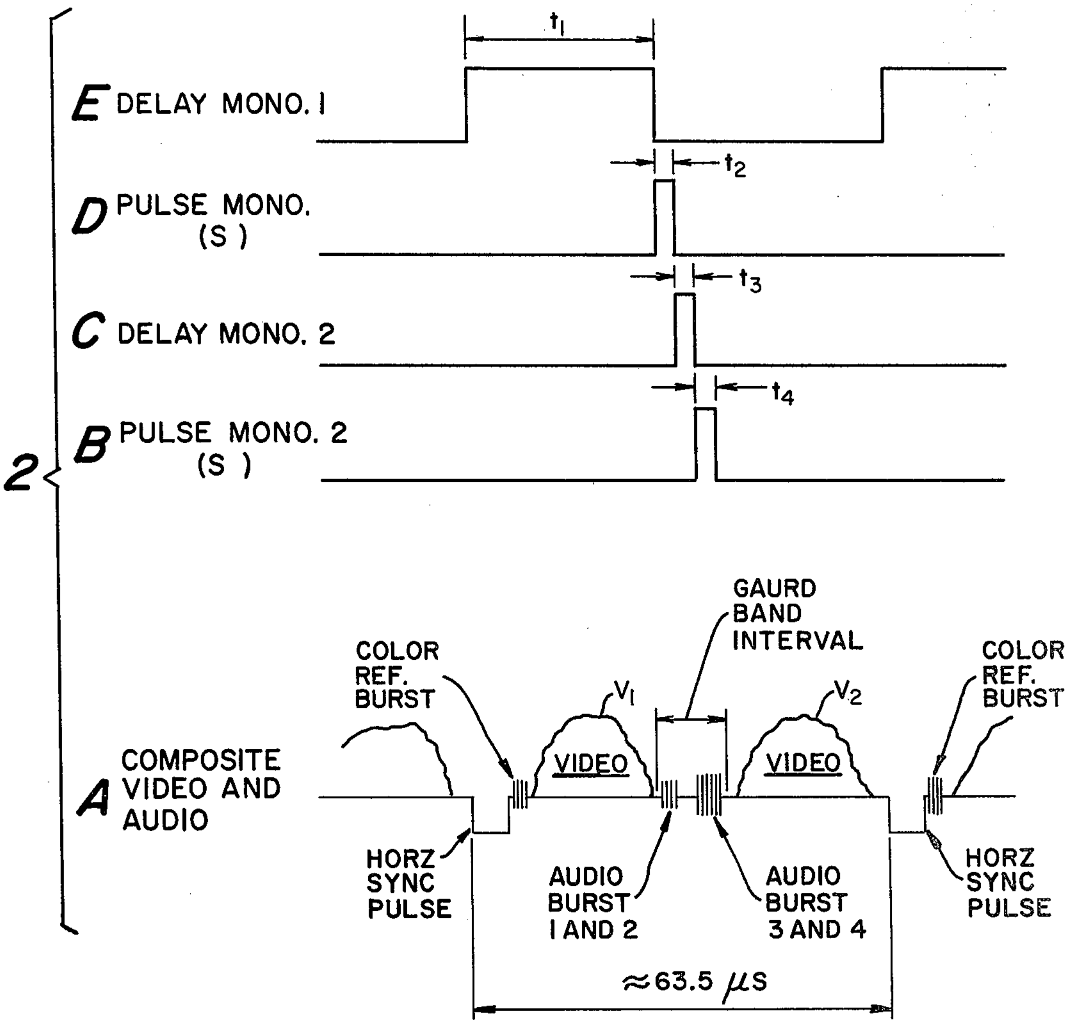
Figure 3:
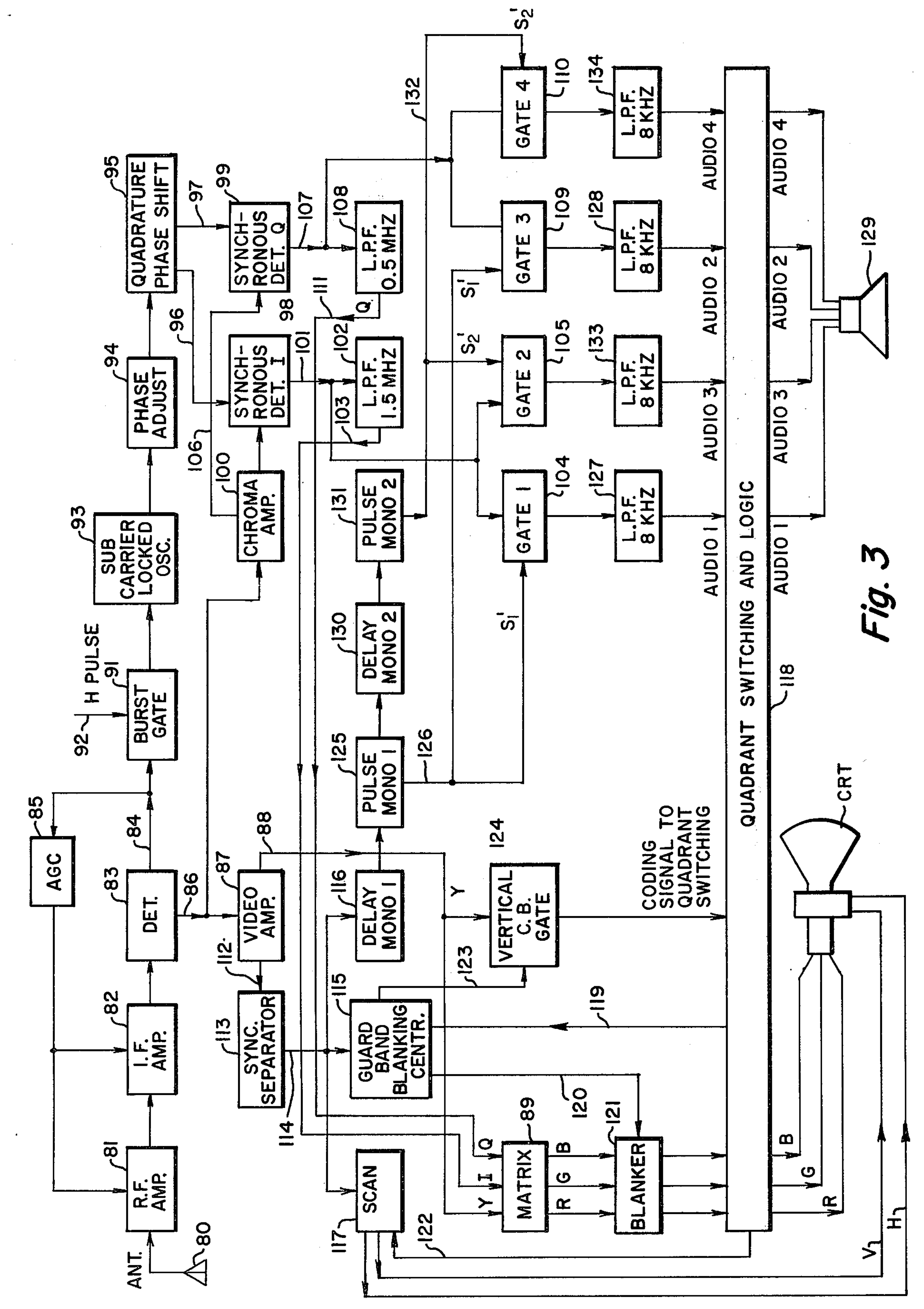

These features and advantages of the present invention as well as others will be more fully understood when the following description is read in light of the accompanying drawings, in which:

FIG. 1 is a block diagram of a television transmitter for transmitting audio signals during a blanked guard-band interval according to the features of the present invention;

FIGS. 2A–2E comprise waveforms illustrating the operation of the circuitry of FIGS. 1 and 3;

FIG. 3 is a block diagram of a television receiver illustrating one form of circuitry employed to demodulate audio signals inserted onto a video signal during a blanked guard-band interval according to the features of the present invention; and FIG. 4 is a modified form of the monostable multivibrator circuitry used to sample audio signals according to the present invention.

With reference now to the drawings, and particularly to FIG. 1, a television encoder is shown enclosed by broken lines and identified by the general reference numeral 10. The encoder actually incorporates modifications to a standard form of encoder used for the transmission of color video pictures according to N.T.S.C. standards. This encoder is used to transmit a number of signals which include video signals for pictures to be displayed in each of four quadrants of the receiving tube, coding signals and a plurality of audio signals.

The video signals are produced by means such as a plurality of television cameras or a plurality of tape recorders. This source of video signals is illustrated in the drawings as a source of quadrant video signals 11 which are in the form of composite video signals for monochrome or color pictures, and each signal is transmitted by lines usually provided for the transmission of color video signals. These lines are denoted as R, G and B and are connected to guard-band blanker 12. In order to maintain proper synchronous relation of the video signals, horizontal and vertical sync pulses are delivered along lines 13 and 14 from a sync generator 15 to the source of video signals 11 and to a guard-band blanking generator 16. This generator produces control pulses in lines 17 and 18 for the synchronous operation of the guard-band blanker so as to define in the ultimate horizontal video signal line a blanked guard-band interval. This interval is shown in FIG. 2 where it will be observed that the blanked interval lies between two video signal bursts V1 and V2. In other words, the guard-band interval divides the conventional video information into two separate bursts of video signals. As a result, the guard-band interval will ultimately appear on the face of the receiving tube as a vertical bar at either side of which pictured information is displayed. Since quadrants of video information are provided, in the preferred form this bar may be conveniently used to divide the quadrants into a right pair of quadrants and a left pair of quadrants. The guard-band interval may, if desired, be located immediately following the color reference burst signal during each horizontal picture scan line. In this event, a vertical bar lacking video information will be displayed on the picture tube at the left hand side of the TV screen.

The blanked video signals are delivered from the blanker 12 to the encoder 10 where they are connected to the matrix circuitry 21. The matrix circuitry produces output signals conventionally denoted as a Y video signal in line 22, an I video signal in line 23 and a Q video signal in line 24. The Y video signal is connected to a complex adder circuitry 25 which includes delay means, sync pulse adder and a code adder. This circuitry receives composite sync pulses along line 26, and code pulses along line 27 which are delivered from a code adder 28. The adder receives a vertical sync pulse in line 29 which is combined with a code input signal in line 30. The purpose of the adder 25 is to introduce onto the Y signal coded signals during vertical blanking periods or the time of the video back porch. The Y signal from the adder 25 is delivered by line 31 to an adder 32.

In the form of the present invention illustrated in FIG. 1, there is provided circuitry to sample and insert pairs of audio signals in the form of signal bursts during the blanked guard-band interval. This circuitry includes a monostable multivibrator 35 receiving the horizontal sync pulse in line 36 from the sync generator 15. The delay characteristics of the multivibrator 35 are shown in FIG. 2E. The multivibrator operates for a period of approximately 30 microseconds which is denoted at $t_1$, the duration of which includes the horizontal sync pulse, the color reference burst and the video information V1. At the end of time $t_1$, a pulse is delivered to a pulse monostable multivibrator 37 which produces a pulse S1 in line 38 for a duration represented in FIG. 2D as $t_2$. The pulse S1 is used to render conductive gate sampler circuits 41 and 42 that receive an audio input signal along lines 43 and 44, respectively. During the time of the pulse S1, the samplers 41 and 42 produce audio sample signals A1 and A2 in lines 45 and 46, respectively, which in turn deliver these signals to adder circuitry 47 and 48, respectively. At the end of time period $t_2$, a pulse is delivered to a delay monostable multivibrator 49 having a delay time shown by FIG. 2C as $t_3$. This time period corresponds to the separation between subcarrier bursts of audio signals A1, A2 and A3, A4, as shown in FIG. 2A.

At the end of time period $t_3$, a pulse is delivered to a pulse producing monostable multivibrator 51 having an operative period represented in FIG. 2B at $t_4$ during which a pulse signal S2 is produced in line 52. This pulse renders conductive gate sampler circuits 53 and 54 that receive third and fourth audio signal inputs, respectively. The gate samplers 53 and 54 produce audio signals A3 and A4 in lines 55 and 56, respectively, that are connected to the adder circuits 47 and 48, respectively.

In the encoder 10, the I video signal is conducted by line 23 to a low-pass filter and delay circuit 57 from where the I signal is connected to the adder 47. Since blanking of the I signal occurs when audio signals A1 and A3 occur, no signal overlap takes place. The adder 47 is used to add, to the I signal, and audio signals A1 and A3, a pulse signal transmitted along line 58 from a burst pulse amplifier 59 having a burst flag input signal delivered along line 61. From the adder 47, the I signal is then delivered to balanced modulators 62.

The Q video signal in line 24 is connected to a low-pass filter 63 from where the Q signal is connected to the adder circuit 48 used to combine the Q video with the audio signal pulses A2 and A4 during the guard-band period defined in the Q signal by the blanker 12. The Q signal is also combined with a pulse transmitted along line 64 from the burst pulse amplifier 19. From the adder 48, the Q signal is delivered via line 65 to the balanced modulators 62. The modulators receive the output signals in lines 67 and 71 from a quadrature phase shift circuit 68 which receives a 3.6 megahertz reference input signal along line 69. One of the subcarrier signals is delivered to the balanced modulators in line 67 while the subcarrier signal in its phase shift relation is delivered along line 71 to the balanced modulators 62. Since the I and Q signals are modulated onto a subcarrier signal in the form of amplitude modulations in a quadrature phase relation, the audio signals A1, A2, A3 and A4 which were previously inserted into the I and Q signals as time separated pairs during the blanked guard-band interval, are also amplitude modulated onto a subcarrier signal in a quadrature phase relation. The composite signal output from the balanced modulators 62 is delivered via line 72 to the adder circuit 32 where it is combined with the Y signal to form a final composite signal in line 73 which is connected to a low-pass filter 74 from where the signal is transmitted in a conventional manner on a single television channel using a radio-frequency amplifier and reference oscillator, not shown in the drawings.

The composite signal output from the encoder formed according to the circuitry illustrated in FIG. 1 is received by the antenna 80 of a receiver illustrated by FIG. 3. The receiver is designed to detect and demodulate the composite signal which includes the audio signals inserted during a blanked guard-band interval, as previously described, as well as recover coding signals inserted during the vertical blanking periods. The signal from the antenna is applied to a radio-frequency amplifier 81 whose output is connected to an intermediate frequency amplifier 82 which is in turn connected to a detector 83. The output signal from the detector in line 84 is connected to an automatic gain control amplifier 85 having output signals connected to the amplifiers 81 and 82, in accordance with the usual practice. The signal from the detector 83 is also delivered via line 86 to video amplifier 87 having an output signal in line 88 in the form of a Y video signal which is connected to a matrix circuitry 89.

The signal in line 84 from the detector 83 passes through a burst gate 91 which is rendered conductive by a horizontal sync pulse in line 92. The signal delivered from the burst gate 91 is used to drive a subcarrier locked oscillator 93 from where the signal can be adjusted by the phase adjust circuit 94 according to the usual practice. The phase shift circuit 95 divides the signal into two quadrature phase signals which are connected by lines 96 and 97 to a synchronous detector 98 and 99, respectively. The detector 98 receives the composite subcarrier picture and audio signals from a chroma amplifier 100 connected to line 86 from the detector 83. The detector 98 provides an I video signal in line 101 which, after passing through a 1.5 megahertz low-pass filter 102, it is delivered by line 103 to the matrix circuit 89. The I signal in line 101 is also connected to gates 104 and 105.

The synchronous detector 99 receives the composite subcarrier picture and audio signals in line 106 from the chroma amplifier 100 for the detection of the Q video signal which is delivered by line 107 to an 0.5 megahertz low-pass filter 108 and to gates 109 and 110. The Q signal delivered from the low-pass filter 108 is also connected by a line 111 to the matrix circuitry 89.

Returning now to the video amplifier 87, there is provided an output signal in line 112 to a sync separation generator 113 which produces pulses in line 114 that are, in turn, delivered to the following: a guard-band blanking generator 115; a delay circuit of a monostable multivibrator 116, and to the scan circuits 117 for the cathode-ray display tube. Quadrant switching and logic circuitry 118 are provided for the control of the audio signals and the coding signals. The circuitry 118 includes a programmed circuit which is responsive to the coding signals and signals produced by the student response in regard to the use of information displayed in one of the four quadrants of the picture tube. A feedback signal from circuitry 118 in line 119 is connected to the guard-band blanking generator 115. The generator 115 produces a blanking signal in line 120 for the control of a blanker 121. The blanker receives from the matrix circuit 89 the conventionally identified R, G and B video signals and introduces a blanked guard-band interval into each signal so that when these signals modulate the cathode-ray tube, a clearly defined vertical bar will appear between right and left hand quadrant pairs. In addition, the quadrant switching and logic circuitry 118 provides a control signal in line 122 which is connected to the scan circuit 117 having vertical and horizontal output signals connected to the cathode-ray tube.

The guard-band blanking generator 115 has a second output signal in a line 123 connected to a vertical guard-band gate 124, which is rendered conductive during the vertical blanking period whereby coding signals introduced into the Y luminance signal transmitted along line 88 are gated into the quadrant switching and logic circuitry 118.

In order to recover the audio signals, control signals S1′ and S2′ are produced by a system of monostable multivibrators similar to that provided in the transmitter. The monostable multivibrator 116 is constructed to produce a signal delay time $t_1$ as indicated by FIG. 2E. At the end of the period $t_1$, a pulse is delivered to a pulse monostable multivibrator 125 having a circuit constructed to produce the pulse S1′ during the time interval $t_2$ as illustrated in FIG. 2D. The pulse S1′ is connected by line 126 to gates 104 and 109 conducting audio signals A1′ and A3′ through 8 kilohertz lowpass filters 127 and 128 to the quadrant switching and logic circuitry 118 where after switching one of the signals is delivered to a speaker 129.

After the time period $t_2$, a pulse is delivered to a monostable multivibrator 130 which will produce a time delay illustrated in FIG. 2C of a duration $t_3$. At the end of this time, a pulse is delivered to a pulse producing monostable multivibrator 131. The pulse produced by this multivibrator is identified as S2′ and is delivered by line 132 to gates 105 and 110 rendering them conductive to deliver audio signals A2′ and A4′ through 8 kilohertz low-pass filters 133 and 134 to the quadrant switching and logic circuitry 118 where, after switching, one of these signals may be used to drive the loudspeaker 129.

In referring to FIG. 3, it will be noted that the monostable multivibrator 130 and the pulse producing multivibrator 131 may be combined into a single circuitry according to a modified form of the present invention which is illustrated in FIG. 4. According to this embodiment, the pulse delivered from the monostable pulse producing multivibrator 125 is delivered to a pulse producing monostable multivibrator 135 which is constructed so as to produce a pulse to hold the gates 105 and 110 in their signal passing manner for a period of time represented by the sum of the time periods $t_3$ and $t_4$ shown by FIGS. 2C and 2B, respectively.

Thus, as shown and described in regard to FIG. 3, the demodulation of the I and Q signals at the receiver is based on the I and Q modulation at the transmitter of both color and audio channels. The pulse gating signals S1′ and S2′ have the same time relationship to the sync and guard-band blanking period at the receiver as they did at the transmitter which was previously described in regard to FIG. 1. Hence, these signals occur at the same time as the audio subcarrier bursts. The output of the I and Q synchronous detectors during the audio burst periods are gated by the S1′ and S2′ signals to the low-pass filters and produce the four audio output signals. Since the guard-band blanking is applied to the video signal in the receiver, neither the I and Q video signals or an erratic display of the audio signals is visible on the picture displayed on the cathode-ray tube. If color deflection angles other than I and Q are used in the receiver, two possible methods can be employed for the synchronous detection of audio signals. In the first method, a separate pair of audio synchronous detectors can be used with the correct IQ phase relationship, and the 3.6 megahertz reference subcarrier used in the synchronous detection of these signals can be switched to the required phases for detection of the I and Q signals during a guard-band interval. The second method which is believed more economical of the two has been shown and described in regard to FIG. 3 where the generation of the gating pulses S1' and S2' is carried out as illustrated and described or, in the alternative, simplified manner as described in regard to FIG. 4. The method according to FIG. 4 is characterized by the fact that the pulse is of a longer duration such that the delay monostable multivibrator 130 (FIG. 3) is dispensed with. The coding signals which are inserted during the vertical guard-band blanking interval as previously described are gated through the quadrant logic circuits where they perform audio and picture switching operations in conjunction with student response. The normal audio frequency modulation channel operates in the same way as with conventional receivers.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A transmitter apparatus for a plurality of input audio signals and video signals, all of which are modulated onto a subcarrier for transmission on a single TV carrier signal, the combination comprising:

means for generating a horizontal sync pulse between successive horizontal scan lines forming said video signals;

blanking means in the signal path of said video signals for defining a blanked guard-band interval at a time apart from a generated horizontal sync pulse;

means for sampling each input audio signal, and means for amplitude modulating the sampling of said plurality of audio signals onto a subcarrier during said blanked guard-band interval apart from which interval said video signals are modulated onto the subcarrier during each horizontal picture scan line.

2. A transmitter apparatus according to claim 1 wherein said means for samplings is further defined to include:

gate means for sampling each of said plurality of audio signals during each horizontal picture scan period, said apparatus further comprising, monostable multivibrator means rendering conductive said gate means for delivering sampled audio signals during said blanked guard-band interval to said means for amplitude modulating.

3. A transmitter apparatus according to claim 1 further comprising:

phase shift means for said subcarrier signal connected to said means for amplitude modulating to thereby amplitude and phase modulate pairs of audio signals forming part of said plurality of audio signals onto the subcarrier signal during said blanked guardband interval.

4. A transmitter apparatus according to claim 3 further comprising:

gate means for sampling each one of said plurality of audio signals during each horizontal picture scan line, a first monostable multivibrator means rendering conductive two of said gate means for delivering a first pair of sampled audio signals for amplitude and phase modulation onto said subcarrier during said blanked guard-band interval, and second monostable multivibrator means, rendering conductive two other of said gate means for delivering a second pair of sampled audio signals for amplitude and phase modulation onto said subcarrier during said blanked guard-band interval.

5. A transmitter according to claim 1 wherein said blanked guard-band interval occurs during a portion of the time interval during each horizontal picture scan line used to transmit luminance and chrominance video signals on a subcarrier signal.

6. A transmitter according to claim 5 further comprising adding means for introducing coding signals onto said subcarrier during the occurring time period of vertical blanking between successive horizontal picture scan lines.

7. A transmitter according to claim 1 further comprising matrix means receiving said video signals wherein there is defined said blanked guard-band interval during each horizontal picture scan line.

8. A transmitter according to claim 7 wherein said video signals correspond to a different scene for display in four quadrants of a television receiving tube.

9. An educational television system including the use of a plurality of input audio signals and video signals all of which are carried by a subcarrier on a single RF carrier signal, a transmitter comprising the combination of:

gate sampler means for each of said plurality of audio signals, pulse control means for rendering conductive said gate sampler means to provide time delayed pairs of said audio signals, means for generating a horizontal sync pulse between successive horizontal scan lines forming said video signal;

blanker means in the signal path of said video signals for defining a blanked guard-band interval at a time apart from a generated horizontal sync pulse, and means for modulating one audio signal of each pair onto a subcarrier in a phase displaced relation during said blanked guard-band interval apart from which interval said video signals are modulated onto the subcarrier during each horizontal picture scan line.

10. An educational television system according to claim 9 wherein said pulse control means include a first monostable multivibrator for producing a time delayed first signal, a second monostable multivibrator responsive to said first signal for producing a signal pulse to render conductive two of said gate sampler means, and a third monostable multivibrator responsive to a signal from said second monostable multivibrator for producing a signal pulse to render conductive two other of said gate sampler means.

11. An educational television system according to claim 10 wherein said pulse control means further include a fourth monostable multivibrator actuated in response to a signal from said second monostable multivibrator for producing a time delayed second signal to actuate said third monostable multivibrator.

12. An educational television system according to claim 11 further comprising quadrature phase shift means includng a 3.6 megahertz subcarrier signal for delivering quadrature phase subcarrier signals to said means for modulating.

13. An educational television system according to claim 12 further comprising adding means for introducing a plurality of coding signals during the occurring time period of vertical blanking.

14. An educational television system including a receiver for an RF carrier signal having a subcarrier signal containing modulated video signals and bursts of modulated pairs of audio input signals during a blanked guard-band interval located apart from a horizontal sync pulse in the video signals, said receiver comprising the combination of:

detector means for demodulating said RF carrier signal to recover said subcarrier signal, means for demodulating said subcarrier signal to recover said video signals which include pairs of audio signals arranged within said blanked guard-band interval, gate means receiving the demodulated subcarrier signals, gate control means for rendering conductive said gate means during said blanked guard-band interval to recover the audio signals from each pair thereof, speaker means for said audio signals, and switching means for selecting one of the audio signals to drive said speaker means.

15. An educational television system according to claim 14 wherein said receiver further comprises:

guard-band blanker means in the signal path of the demodulated video signals, and blanking signal means for controlling said blanker means to provide a blanked guard-band interval in the demodulated video signals during recovery of the audio signal by said gate control means.

16. An educational television system according to claim 15 wherein said gate control means include a first monostable multivibrator for producing a time delayed first signal, a second monostable multivibrator responsive to said first signal for producing a signal pulse to render conductive two gates of said gate means, and a third monostable multivibrator responsive to a signal from said second monostable multivibrator for producing a signal pulse to render conductive two other gates of said gate means.

17. An educational television system according to claim 16 wherein said gate control means further include a fourth monostable multivibrator actuated in response to a signal from said second monostable multivibrator for producing a time delayed second signal to actuate said third monostable multivibrator.

18. An educational television system according to claim 17 further comprising filter means for each audio signal passing between said gate means and said switching means.

19. An educational television system according to claim 18 further comprising:

code signal gate means receiving a video signal, and signal generating means for rendering conductive said code signal gate means during the occurring time period of vertical blanking.

20. An educational television system according to claim 19 further comprising matrix means receiving said demodulated video signals for providing decoded video signals to said guard-band blanker means, said decoded video signals corresponding to composite frame of different scenes for display in four quadrants of the receiving tube.

* * * * *